US011232617B2

(12) United States Patent
Barber

(10) Patent No.: US 11,232,617 B2
(45) Date of Patent: *Jan. 25, 2022

(54) DIGITAL IMAGING METHOD AND APPARATUS

(71) Applicant: Pamela L. Barber, San Diego, CA (US)

(72) Inventor: Pamela L. Barber, San Diego, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/739,109

(22) Filed: Jan. 9, 2020

(65) Prior Publication Data

US 2020/0175737 A1 Jun. 4, 2020

Related U.S. Application Data

(63) Continuation-in-part of application No. 15/868,345, filed on Jan. 11, 2018, now Pat. No. 10,561,943.

(51) Int. Cl.
*A63F 13/00* (2014.01)
*A63F 9/24* (2006.01)
(Continued)

(52) U.S. Cl.
CPC ............ *G06T 11/60* (2013.01); *G06T 3/0012* (2013.01); *G06T 3/0068* (2013.01); *G06T 3/40* (2013.01);
(Continued)

(58) Field of Classification Search
CPC ........ A63F 2300/6018; A63F 2300/696; A63F 13/02; A63F 13/10; A63F 13/12;
(Continued)

(56) References Cited

U.S. PATENT DOCUMENTS

| 4,891,660 A | * | 1/1990 | Biondo, Jr. ............ | G03B 17/53 396/283 |
| 5,117,283 A | * | 5/1992 | Kroos ...................... | H04N 9/75 348/564 |

(Continued)

*Primary Examiner* — Milap Shah
(74) *Attorney, Agent, or Firm* — Kizzia Johnson, PLLC

(57) ABSTRACT

An apparatus and method for electronically creating combined digital images of a person and incorporating them into a series of background images or film clips making it appear as if the user were actually a part of the original imaging sequence. The camera can move to take the images from different angles and in an alternative embodiment there are multiple cameras situated such that they sequentially capture and store a series of images to be incorporated into the product. An alternative housing apparatus is in a booth for automatically producing an imaging sequence of a self-portrait of the user integrated into a stored background or film clip, including a cash or credit card receiving device, a computer triggered by cash or credit received in the device, a movable digital camera or video camera to view the user, a video monitor for self-viewing, and the possibility of one located outside the booth for advertising or amusement purposes. A series of stored digital imaging movie clips for selective withdrawal by the user where the captured sequence of the user is automatically integrated into stock stored movie clips and can be either output in an e-mail message posted to a board with a link to user's choice of e-mail friends' addresses for retrieval or a direct link to friend's and family's e-mail addresses or an output device with hard copy of personalized sequence to CD ROM or Video or hard copy print of a still image.

6 Claims, 13 Drawing Sheets

(51) Int. Cl.
*G06T 11/00* (2006.01)
*G06T 17/00* (2006.01)
*G06T 11/60* (2006.01)
*G06T 3/00* (2006.01)
*G06T 3/40* (2006.01)
*G06F 3/0484* (2013.01)

(52) U.S. Cl.
CPC ...... *G06F 3/04845* (2013.01); *G06T 2200/24* (2013.01)

(58) Field of Classification Search
CPC ......... G06T 11/00; G06T 11/60; G06T 13/40; G06T 2200/24; G06T 2219/20; G06T 2219/2004; G07F 17/32; G07F 17/323; H04N 5/272
See application file for complete search history.

(56) References Cited

U.S. PATENT DOCUMENTS

| | | | | |
|---|---|---|---|---|
| 5,595,389 | A * | 1/1997 | Parulski | A63F 13/10 463/31 |
| 5,687,306 | A * | 11/1997 | Blank | H04N 1/3873 345/634 |
| 5,850,222 | A * | 12/1998 | Cone | G06T 17/20 345/418 |
| 5,937,081 | A * | 8/1999 | O'Brill | G06T 11/00 382/111 |
| 6,016,148 | A * | 1/2000 | Kang | G06T 15/04 345/622 |
| 6,061,532 | A * | 5/2000 | Bell | A63F 13/00 345/629 |
| 6,139,432 | A * | 10/2000 | Watanabe | A63B 24/0087 463/31 |
| 6,283,858 | B1 * | 9/2001 | Hayes, Jr. | G06K 9/00268 345/418 |
| 6,285,381 | B1 * | 9/2001 | Sawano | G06T 19/20 345/582 |
| 6,351,265 | B1 * | 2/2002 | Bulman | G06T 11/60 345/660 |
| 6,400,374 | B2 * | 6/2002 | Lanier | G06F 3/14 345/630 |
| 6,507,361 | B1 * | 1/2003 | Barber | G06T 11/60 348/207.2 |
| 6,556,196 | B1 * | 4/2003 | Blanz | G06K 9/00275 345/419 |
| 6,664,956 | B1 * | 12/2003 | Erdem | G06T 17/20 345/419 |
| 6,677,967 | B2 * | 1/2004 | Sawano | G06T 19/20 715/716 |
| 6,894,686 | B2 * | 5/2005 | Stamper | A63F 13/02 345/419 |
| 6,970,177 | B2 * | 11/2005 | Yamada | A63F 13/10 345/629 |
| 6,994,626 | B1 * | 2/2006 | D'Achard Van Enschut | A63F 13/10 463/31 |
| 7,027,054 | B1 * | 4/2006 | Cheiky | G06T 13/40 345/473 |
| 7,048,630 | B2 * | 5/2006 | Berg | G07F 17/32 463/16 |
| 7,176,956 | B2 * | 2/2007 | Rzeszewski | H04N 7/147 348/14.01 |
| 7,184,047 | B1 * | 2/2007 | Crampton | G06T 17/00 345/473 |
| 7,227,976 | B1 * | 6/2007 | Jung | G06K 9/00228 345/419 |
| 7,285,047 | B2 * | 10/2007 | Gelb | A63F 13/12 463/31 |
| 7,713,129 | B2 * | 5/2010 | Yamada | G06T 13/40 463/44 |
| 7,809,162 | B2 * | 10/2010 | Steinberg | H04N 5/23218 382/103 |
| 7,859,551 | B2 * | 12/2010 | Bulman | H04N 7/162 345/630 |
| 8,047,915 | B2 * | 11/2011 | Lyle | A63F 13/65 463/31 |
| 8,100,766 | B2 * | 1/2012 | LeBlanc | G07F 17/32 463/31 |
| 8,437,514 | B2 * | 5/2013 | Wen | G06K 9/00268 382/118 |
| 9,492,750 | B2 * | 11/2016 | Barber | A63F 13/10 |
| 9,901,829 | B2 * | 2/2018 | Barber | G06T 11/00 |
| 10,561,943 | B2 * | 2/2020 | Barber | A63F 13/52 |
| 2001/0044725 | A1 * | 11/2001 | Matsuda | G10L 19/00 704/269 |
| 2002/0012454 | A1 * | 1/2002 | Liu | G06K 9/00281 382/118 |
| 2003/0035013 | A1 * | 2/2003 | Johnson | A63F 13/335 715/856 |
| 2003/0051255 | A1 * | 3/2003 | Bulman | G06Q 30/00 725/135 |
| 2003/0206171 | A1 * | 11/2003 | Kim | G06T 11/00 345/473 |
| 2003/0214518 | A1 * | 11/2003 | Yamada | A63F 13/323 345/629 |
| 2004/0152512 | A1 * | 8/2004 | Collodi | A63F 13/335 463/30 |
| 2004/0224772 | A1 * | 11/2004 | Canessa | A63F 13/335 463/42 |
| 2004/0250210 | A1 * | 12/2004 | Huang | G06Q 10/10 715/706 |
| 2005/0007384 | A1 * | 1/2005 | Yamada | A63F 13/213 345/619 |
| 2005/0085296 | A1 * | 4/2005 | Gelb | G06T 15/02 463/31 |
| 2005/0246495 | A1 * | 11/2005 | Edwards | G11B 20/10 711/115 |
| 2006/0068861 | A1 * | 3/2006 | Triestram | A63F 13/493 463/1 |

* cited by examiner

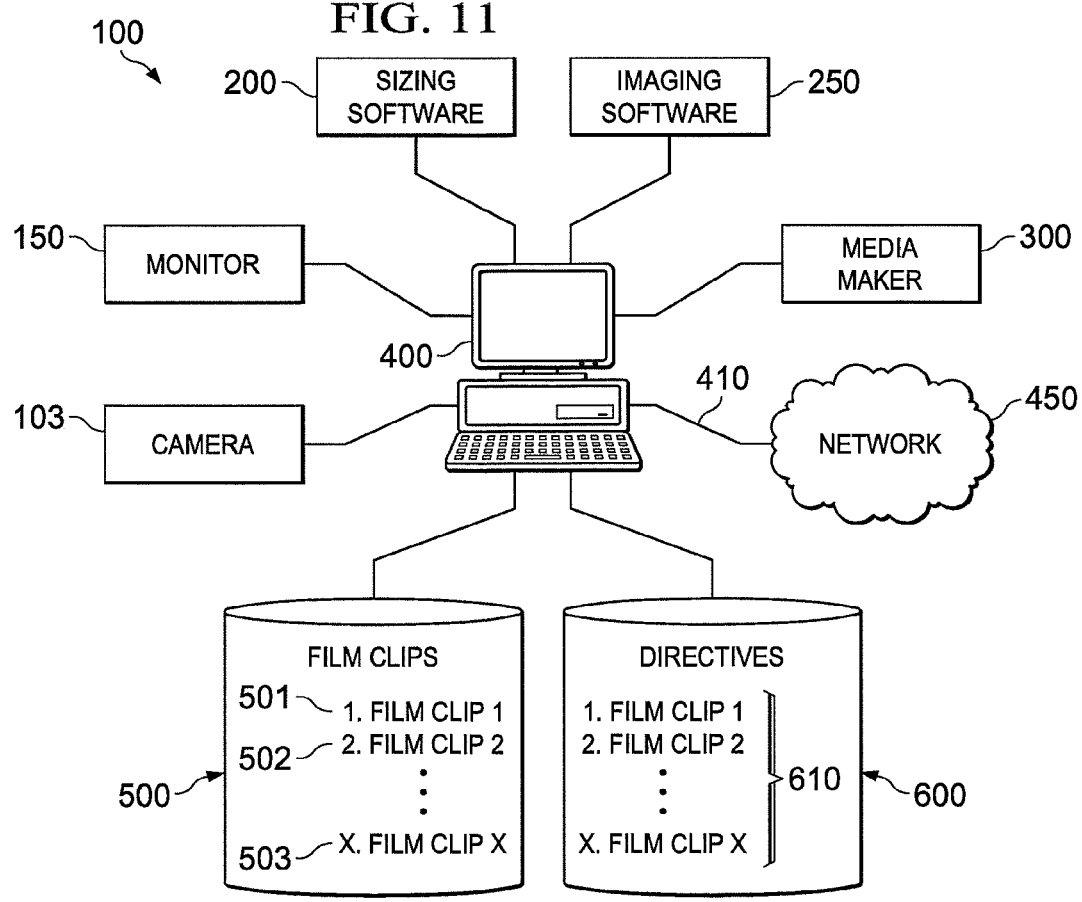
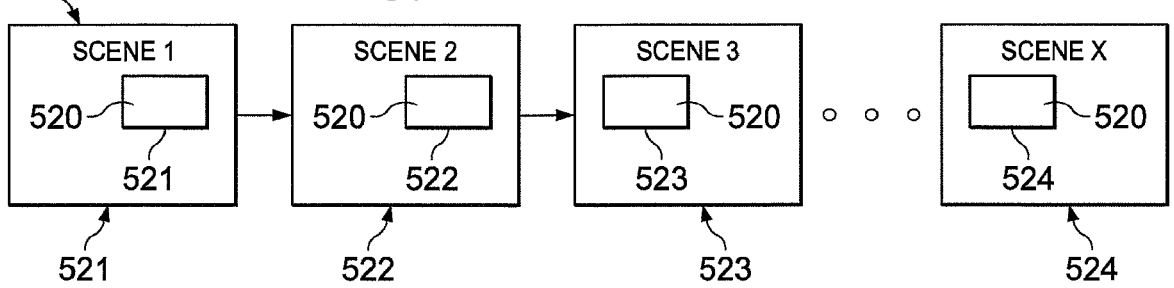

DIGITAL IMAGING METHOD AND APPARATUS

CROSS-REFERENCE TO RELATED APPLICATION

This application is a continuation-in-part of U.S. patent application Ser. No. 15/868,345, which is a continuation-in-part of U.S. patent application Ser. No. 11/997,067/U.S. Pat. No. 9,492,750, filed Jul. 15, 2008, issued Nov. 15, 2016; and further continuation-in-part of U.S. patent application Ser. No. 15/351,301, filed Nov. 14, 2016 and further continuation-in-part of U.S. Patent Application Ser. No. 60/703,746 filed Jul. 29, 2005.

TECHNICAL FIELD

This Invention pertains to the field of digital imaging. More particularly, the invention pertains to an apparatus for electronically producing souvenir still images, film clips or video games incorporating the user into the stored background or sequential series of backgrounds, or video games.

REFERENCE TO COMPUTER PROGRAM LISTING APPENDIX

Applicant incorporates by reference the materials on the two CDROMS submitted with the parent application Ser. No. 11/997,067, said materials described as follows:

The files contained on submitted CDROMs {Copy 1 and Copy 2—These discs are identical) are as follows:

| NAME | SIZE | CREATION DATE |
| --- | --- | --- |
| flash_decompiler.exe | 3595 KB | 6/8/2005 02:03:38 PM a |
| magnet.swf | 131 KB | 6/8/2005 03:.11:14 PM a |
| magnet24.fla | 1139 KB | 6/8/2005 01:46:08 PM a |
| magnetmancontent.swf | 50 KB | 5/29/2003 02:46:30 AM a |
| magnetmancontent2.fla | 819 KB | 5/29/2003 02:46:26 AM a |
| princesscontent.swf | 77 KB | 6/16/2003 01:31:48 PM a |
| princesscontent 2.fla | 710 KB | 6/16/2003 01:19:50 PM a |
| Sweetpeacontent.swf | 105 KB | 6/8/2005 01:46:54 PM a |
| sweetpeacontent2.fla | 443 KB | 5/29/2003 02:38:46 AM a |

9 file(s)
Total files size: 7 MB; 7072 KB; 7241776 Bytes
Machine Format: IBM-PC
Operating System: Windows XP Copy 1 and Copy 2 are Windows XP based CDROMs. The file labeled flash decompiler.exe is a "viewer" that when loaded and installed will allow the four (4} files labeled ".swf" to be interpreted. The ".swf files are Shockwave format. The four (4) files labeled ".fla" are Flash MX 2004 "actionscript" files.

BACKGROUND OF THE INVENTION

In the field of personalized portraits, it is known to provide a painted backdrop for an individual to stand before, whose picture is taken with a camera so that the end result is a photograph where the person's image is superimposed against the backdrop. Similarly, it is known to create an image of a user digitally using a computer and stored digital images (See U.S. Pat. No. 6,507,361}. It is known in the field that videos can be taken where the user stands in a booth and performs for a few minutes while a video recorder records the user's voice and actions.

Finally, it is known in the field that in-home set-ups an operator can capture the image of themselves, or a customer's image can be manually inserted, through the use of a digital camera or scanner and standard imaging software cut and paste processes, placed as a single image to be merged into either a still or film clip in a single pose, cut out, pasted on a standard generic body that is size and one skin tone.

These previously known methods present a number of problems. In the first instance the camera must be loaded and the film processed, there are lighting challenges and the user does not have the ability to preview and edit the final product before printing it. Secondly, the user has only the option of selecting one of a series of still images where the choices are limited. Thirdly, where the user stands in the booth and has their image continually recorded for several minutes, the user feels awkward, it is boring and therefore does not have the mass appeal that is desirous of a professional video tape, resulting in an amateurish product. Finally, regarding the in-home video games, the user must purchase costly equipment and integrate their image on their own with a stock one sized body producing an unnatural and undesirable end product where every user (whether a seven-year-old boy or a 50-year-old woman) will have the same size and shape of body attached to their head. The cost of the necessary equipment alone places the product outside the realm of mass marketing.

On another subject, many travelers desire to communicate with their friends and relatives during their travels. Some are desirous of retaining souvenirs. Many wish to send a photograph of themselves in front of various national treasures or historical monuments, or take home videos of the same tourist attractions with a different user over and over again.

SUMMARY OF THE INVENTION

This invention comprises a novel apparatus and method for taking a single or series of multiple images of the user for a short period of time and integrating it or them into a plurality of background options chosen by the user for a souvenir. The stored images may be either realistic looking or illustrated lending an amusement quality to the product. The self-portrait film clip or still image is available for viewing after a brief interlude.

The user is instructed through a series of directives while the camera records the user alone with the monitor screen and/or digital recorded voice annunciations such directives as "smile", "wave", "look to your left", "look surprised", "look frightened" or such other actions as may be dictated by the souvenir item. After or before the short film clip is captured, the user may select a particular series of images or still image for incorporation into the montage. The background or series of backgrounds may be chosen from a plurality of pre-selected stored backgrounds that may be indigenous to the area where the apparatus is located so as to eliminate the necessity of the user's physical presence at the location shown in said background or said backgrounds. For example, if a user is in a booth in San Francisco the user may select a series of events where the user appears to be inside the open window of a helicopter over San Francisco (FIG. 1, upper right-hand quadrant-helicopter with man inside} viewing the Golden Gate Bridge from the helicopter (FIG. 1, upper left-hand quadrant) or in a San Francisco Cable Car (FIG. 1, lower-left quadrant—cable car with man inside window) looking at the "Painted Ladies" row of houses. The invention will utilize a portion of such original custom film clip placed either by the "video window" method or by "chromakey"—both methods are known by those skilled in art. The helicopter will take off and you will see a series of shots taken from the perspective of the user sitting inside the helicopter and the customer's image will not be displayed during this time period and the film will discuss (narrate) what is taking place in the San Francisco image what the observer is seeing, then the film may cut to a rickshaw with the user inside it in the Chinatown area of San Francisco, or inside a cable car window or on the BART [Bay Area Rapid Transit] transportation system (FIG. 2, upper left quadrant—man in BART train}, where the user's image is placed sitting down on the train and the multiples layers of imaging allow the stored film clip of a thief to run past the user, steal a shopping bag placed on the ground in front of the user and run out the other end of the car. As another example, if the user chooses to be an astronaut, then the user's wo 2007/016596 PCT/US2006/030006 appropriate stored image and another diaphanous layer is placed on top of the user's image making it appear as though the user was wearing a spacesuit with glass on the user's face {FIG. 2, upper right quadrant, man in spacesuit). Similarly, the user may be placed in a small trailer of a current or classic movie, such as the Wizard of Oz. (FIG. 2, lower right quadrant—man standing beside or interacting with Dorothy, the tin man, the Lion or the Scare Crow). In the case of video games (see the Computer Program Listing Appendix—video kid game}, the user will have multiple images of their self placed into existing or new video games where the size of the generic body will be selected for age and/or gender appropriateness. The user will leave the booth or the stand-in-front-of kiosk with a customized video game where they, as the star, can run and jump and interact like other super stars in a video game, but this one is of the user.

Another embodiment shows multiple users of varying numbers composing a group photo, such as "Olde Time" Photos where the user can select not only the age and gender appropriate generic •body size but can select and change various outfits or articles of clothing for selection and display, changing their mind and outfits as they please a number of times (FIG. 2, lower left quadrant—image of man in safari suit with hat or, upper right quadrant—man in space suit). The next user will be added to the assemblage, one at a time, eliminating the need to work together and the machine will assemble the various individual shots into a composite for output by printer or for e-mail posting on a board or individual e-mail as selected by the user.

BRIEF DESCRIPTION OF THE DRAWINGS

FIGS. 4, 5, 6 and 7 are screen shots from software of a type used to create images with face photos.

FIG. 11 is a system diagram for a kiosk or other station for taking a series of pictures of the user and for creating and delivering the souvenir media product which incorporates therein one or more of the pictures of the user.

FIG. 12 is a scene sequence.

DETAILED DESCRIPTION OF THE INVENTION

An improved imaging apparatus for still, moving or video games is provided by the present invention. Either booth or a portable apparatus (such as, but not limited to those apparatuses shown in U.S. Pat. Nos. 5,343,386 and 6,507,361, all and both of said U.S. patents being incorporated herein by reference) is used for forming on a substrate, by e-mail, onto a CD, DVD, Videocassette or video game cartridge the electronic image of a person in predetermined background surroundings, which apparatus 100 have a housing made of suitable material such as fiberglass that also has an opening. This apparatus 100 is convenient for such locations as shopping malls, amusement parks, toy stores or scenic locations in a national park.

Figure 13:
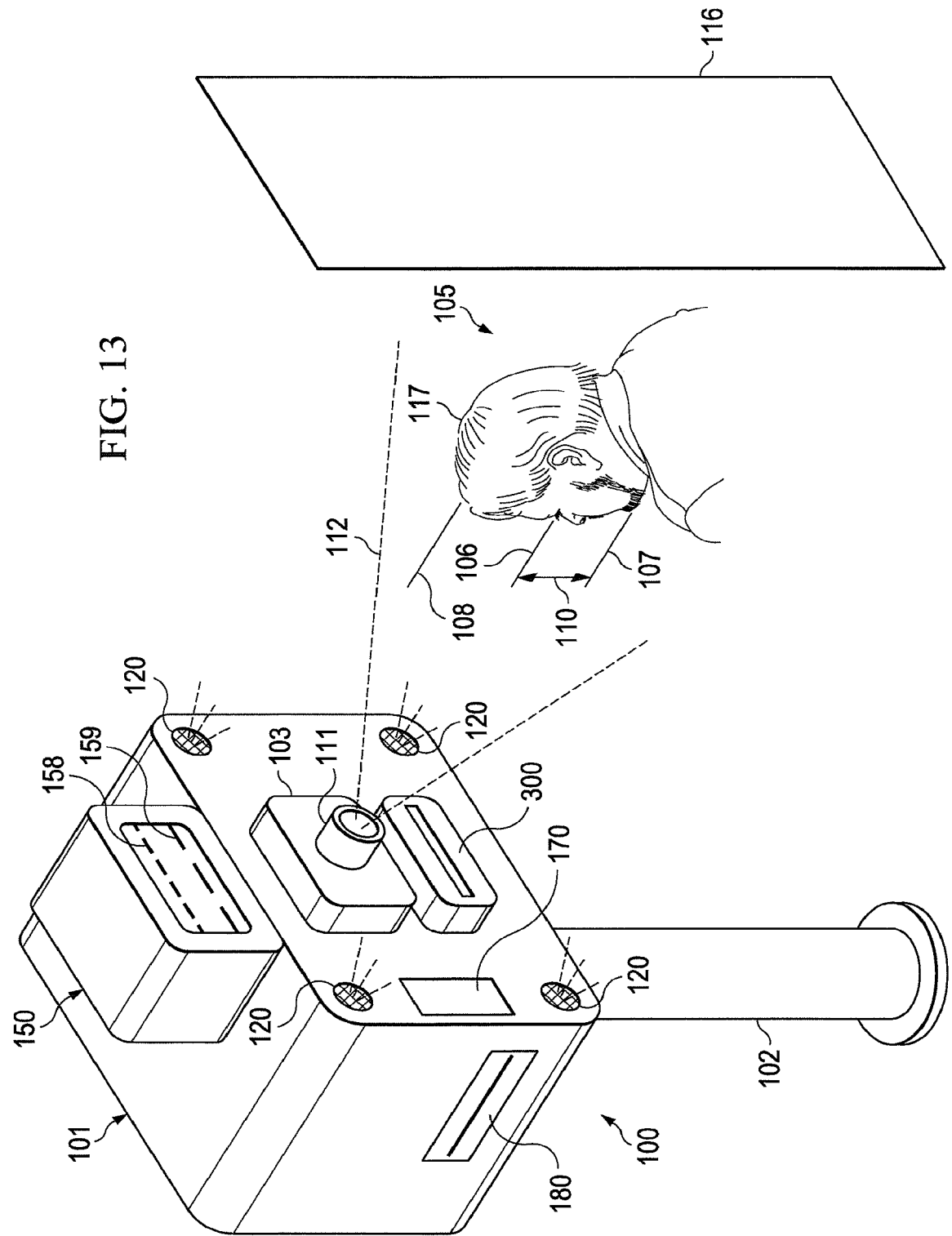
FIG. 13 is camera system taking a picture of a user.

As shown in FIGS. 11 and 13, for example, a housing 101 can be mounted on a counter top or another convenient surface. Alternatively, a base 102 can be attached to the housing 101 for supporting the housing above the ground, or in the case of a booth, placed on the ground.

Also, a still or video camera 103 is mounted on the housing 101 and can be moved up or down by the user 105 or by other computer control means for capturing multiple angles of the user 105 for incorporation into pre-selected slots in the video or video game {for instance if a particular scene requires a profile of the user or in the video game, or, if the user is running away from the camera, a shot of the back of the head is appropriate)• Similarly, in certain machines 100 it may be desirous for the camera 103 to take limited angles and provide a generic stored back of the user's head based on hair color and length and style as sampled from the first full face shot of user.

The camera 103 is manually directed to the find the eye level 106 of the user 105 and the chin level 107 or top of the head level 108 as a second indicator to allow the sizing software 200 controlling the apparatus to automatically size by measuring the distance, calculating the necessary size changes for proportional incorporation into a user selected age and gender appropriate body thus giving the appearance of the actual user while only actually using either a portion of the body (such as the face and hair) or. in certain circumstances, the entire, face, hair and body may be used to incorporate into either a traveling video or vacation video or movie clip. The monitor 150 can indicate an "eye level" 158 which the user 105 can align to as the camera 103 displays the live image of the face of the user 105 on the monitor 150. While holding that position, the user 105 can use the control buttons 170 to move a chin line 159 to align with the live image of the user's face chin, thus providing the sizing software 200 with the necessary input to determine the eye-to-chin distance 110 and thus size the face of the user 105 for the souvenir made by the media maker. The still photos with various outfit choices, and combinations of users are incorporated into a final output collaged composite group photo or into the "Video Kid" video game (again, see Computer Program Listing Appendix).

The distance 110 between the eye level 106 and chin level 107 is the more preferred embodiment for sizing the head appropriately for incorporation with the stored generic pre-selected body because various hair styles are bigger than others and consequentially provide a less accurate sizing mechanism.

The camera 103 includes a lens 111 which defines the field of view 112 and the camera 103 is mounted in the housing 101 with the field of view 112 of the lens 111 oriented toward the opening.

Multiple light sources 120 are mounted on the housing 101 and are spaced apart from each other for illuminating the person 105 from various angles for flattering lighting that coincide with the lighting of the stored generic body to provide a natural look in the final product.

As envisioned by the present invention, a souvenir media maker 300 (whether an electronic printer, a CD ROM, DVD, or video recorder or a custom video game cartridge recorder) may be mounted on or to the apparatus 100 that is electronically connected to the camera 103. Furthermore, an appropriately programmed microprocessor 400 may be attached for the apparatus 100 for controlling the aforementioned devices.

In the embodiment of the present invention, a pre-selected area of the background may• be left blank for incorporation of the user 105. Regions within the field of view 112 of the lens 111 are either suppressed by the digital imaging board 250 that appear to be behind the stored background image by video window technology or through chromakey process where the user 105 appears in front of the stored primary background image, but multiple layers may be added in front of either the primary stored background, the user, or other stored foreground images.

Figure 1:
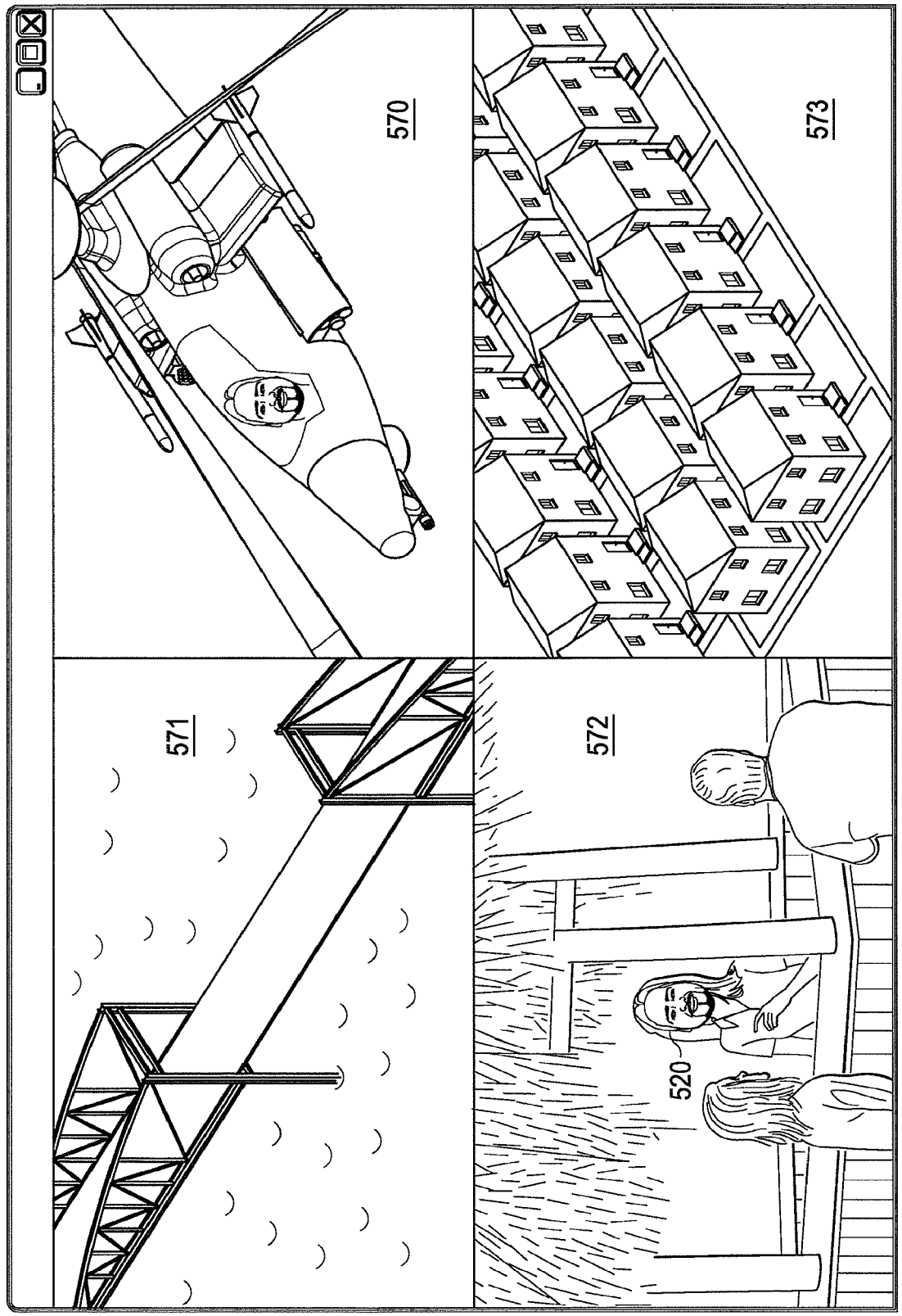
FIG. 1 is four still images from an exemplary souvenir video clip with the user's face incorporated in two of the four images.

As an alternative embodiment, the microprocessor 400 is a personal computer and contains an electronic memory. A plurality of predetermined background images 500 may be stored in the memory of the computer 400. In accordance with the chromakey embodiment the person 105 stands in front of a background of a suitable color (see FIG. 1 from U.S. Pat. No. 6,507,361} and the person 105 imaged by the camera 103. The person's image is transmitted from the camera 103 to the computer 400 which removes the person's image from the solid colored background and electronically sizes and/superimposes or superimposes only with or without skin matching of the stored image to the user's image onto a selectable predetermined background video sequence or video game sequence which is stored in the computer's memory.

A single booth or stand in-front-of-kiosk may contain the "Olde Time" photo hard output device for postcards or souvenir cards or a video, or a CD, DVD or a video, video game cartridge or any combination thereof in a single housing 100.

Alternatively, the process is a non-chromakey method where video windows are used. The camera 103 captures and sends the user's image and a pre-selected area of the background, either a solid surface 116, such as white, in back of the booth, behind the user, a curtain 116 that is slidingly hung behind the user in the stand-in-front-of kiosk, or just the ambient background 116 that appears fuzzy and out-of-focus. The camera 103 captures and sends this part of the image to either the microprocessor 400 or computer 400, or printer 300 where the imaging board 250 combines the image with the stored, user-selected image 515 or sequence of images 510 (as shown in FIG. 12, for example) to an output device 300. Referring further to FIG. 12, in the case of the video game or the live video clips, various segments of the captured user frames 521, 522, 523, 524 are sent to selected locations 520 on the clip 510. For example, a profile 117 of the user 105 may be sent to a scene where the "Video Kid" (as created in the Computer Program Listing Appendix) is running past the front of the frame 551, or a smiling, waving scene is sent to a segment where the user 105 is in a cable car in San Francisco 522, 566 moving across the video screen as if they are waving to the observer. In the case of the "Olde Time" photos the user 105 selects an outfit and the software places the outfit on the user's live "real time" image appropriately sized 561. As shown in FIGS. 3-10, for example, there is illustrated a sequence of example screen shots for presentation to a user. The user may create commands and instructions presented in association with interfaces that are represented, as an example, by the screen shots. The user can change the outfits, hats, blouse, and other components one at a time until satisfied and then freeze the final selection (see FIGS. 4, 5 and 6); and then the next user to be incorporated into the group photo takes their turn in front of the camera 103 and so on until all of the user's selected for incorporation into the group shot have completed the process and then the computer will place the individuals appropriately for viewing, for instance placing the smaller user's in the front for optimum viewing by the observer/recipient.

The present invention may also advantageously include a video monitor 150 that is mounted on the housing 100 and which is electronically connected to the camera 103, for displaying an image of the user 105 so that the user may alter the user's pose as desired prior to freezing the portrait. The freezing of the portrait may be automatic with a user overriding for a final veto, a user-selected freeze button as part of the control keys 170, or merely a countdown (which can be shown on the monitor 150) with an automatic freeze of the customer 105.

Alternatively, a camera 103 may be mounted behind a two-way mirror (NOT SHOWN) for posing and the customer 105 may pose without the aid of a monitor to lower the cost of the unit 100.

Additionally, a currency and credit card/ATM acceptor 180 can be attached to the apparatus and operatively engaged, with the camera 103 and media maker 300 (whether printer, CD ROM, DVD, Video Cassette recorder, or video game cartridge recorder) to activate them upon insertion of an appropriate amount of currency into the acceptor 180. Additionally, a phone line 410 or cable connection 410 may be used to enable the sending of e-mail.

A library of directives 600 are available for each of the available film clips 500. The user 105 is instructed through a series of directive's 610 while the camera 103 records the user 105 alone with the monitor screen 150 and/or digital recorded voice annunciations such directives as "smile", "wave", "look to your left", "look surprised", "look frightened" or such other actions as may be dictated by the souvenir item. After or before the short film clip is captured, the user 105 may select a particular series of images or still image for incorporation into the montage. The background or series of backgrounds may be chosen from a plurality of pre-selected stored backgrounds that may be indigenous to the area where the apparatus is located so as to eliminate the necessity of the user's physical presence at the location shown in said background or said backgrounds. For example, if a user is in a booth in San Francisco the user 105 may select a series of events where the user 105 appears to be inside the open window of a helicopter over San Francisco 570 {Figure ` upper right-hand quadrant-helicopter with man inside) viewing the Golden Gate Bridge from the helicopter 571 (FIG. 1, upper 11 left-hand quadrant} or in a San Francisco Cable Car 572 (FIG. 1, lower-left quadrant—cable car with man inside Window) looking at the "Painted Ladies" row of houses 573.

Figure 2:
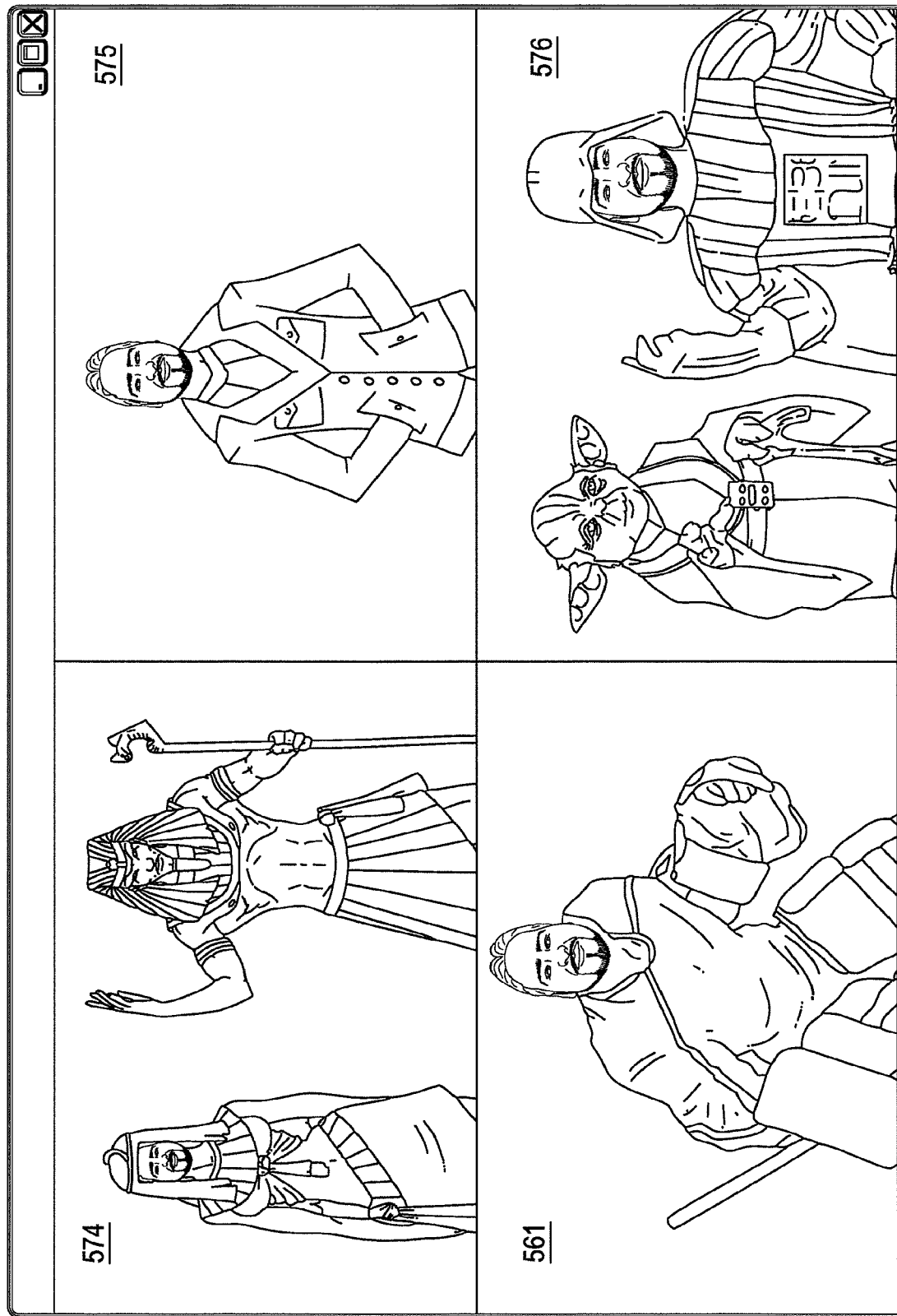
FIG. 2 is four still images from four different souvenir products, each with the user's face incorporated in the image.
Figure 3:
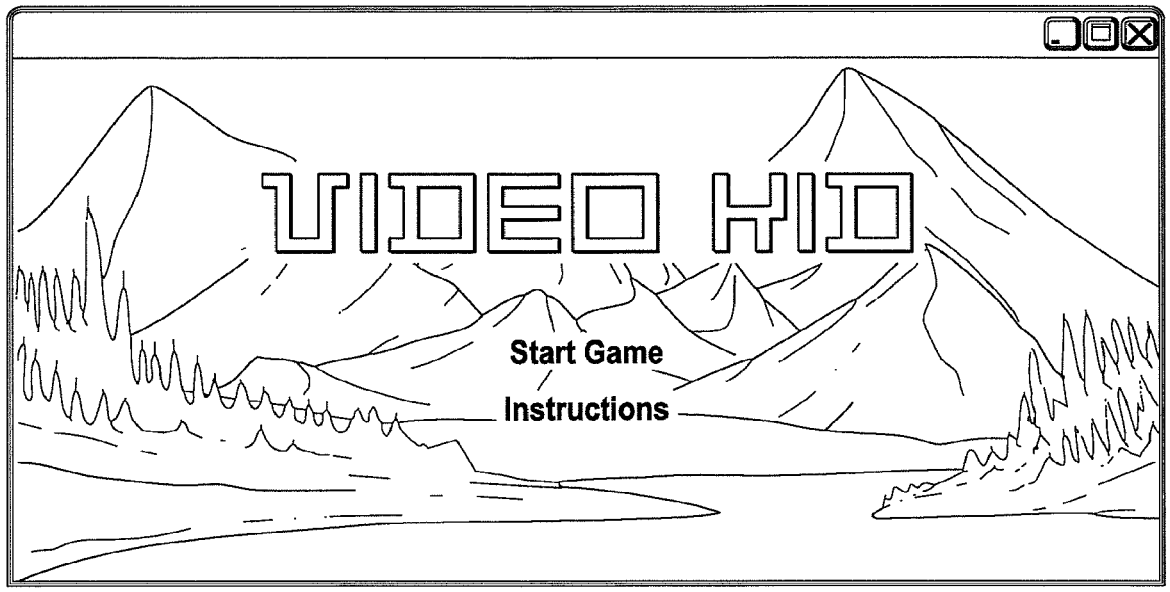
FIG. 3 is a screen shot from an exemplary souvenir video game.
Figure 4:
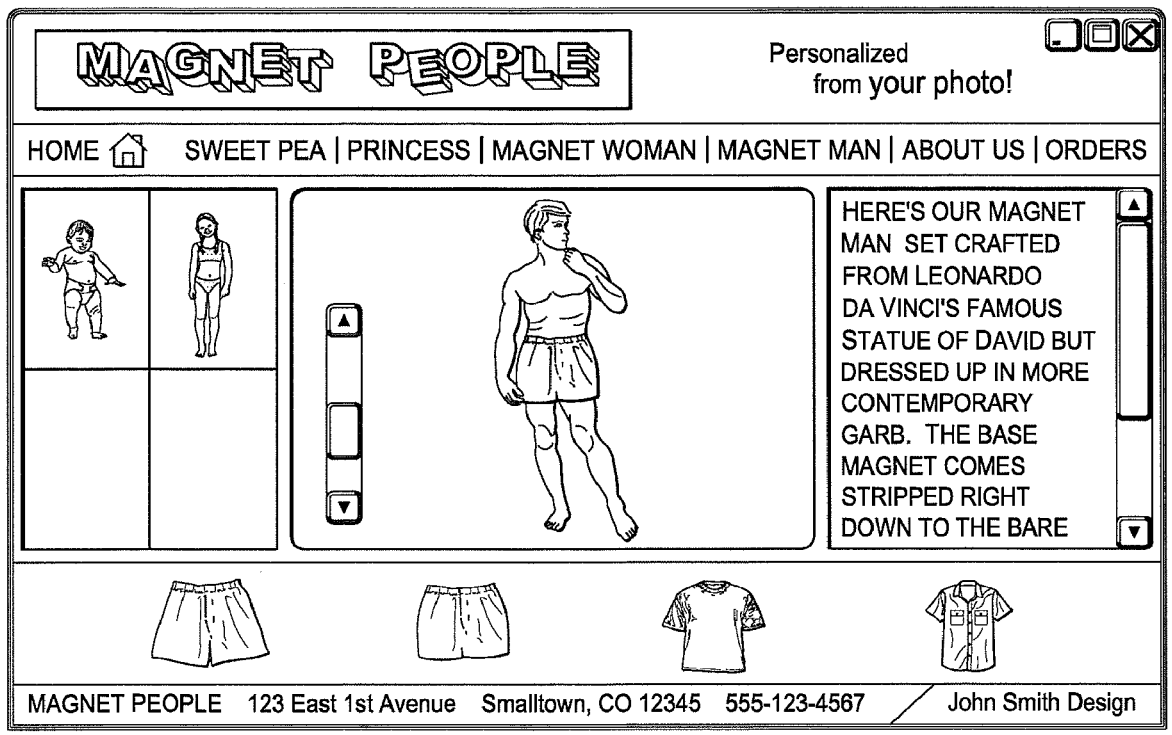
Figures 5, 6:
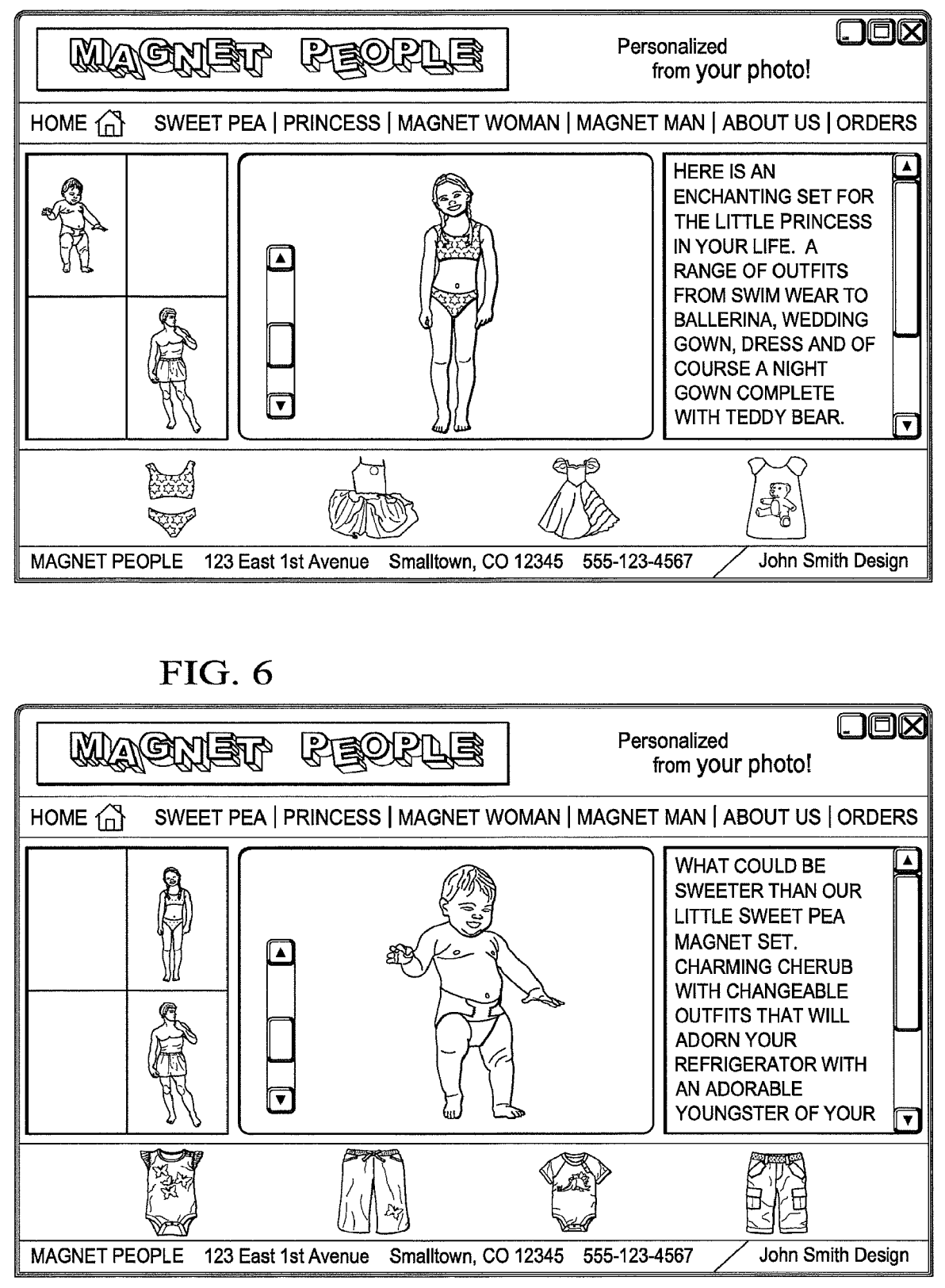
Figure 7:
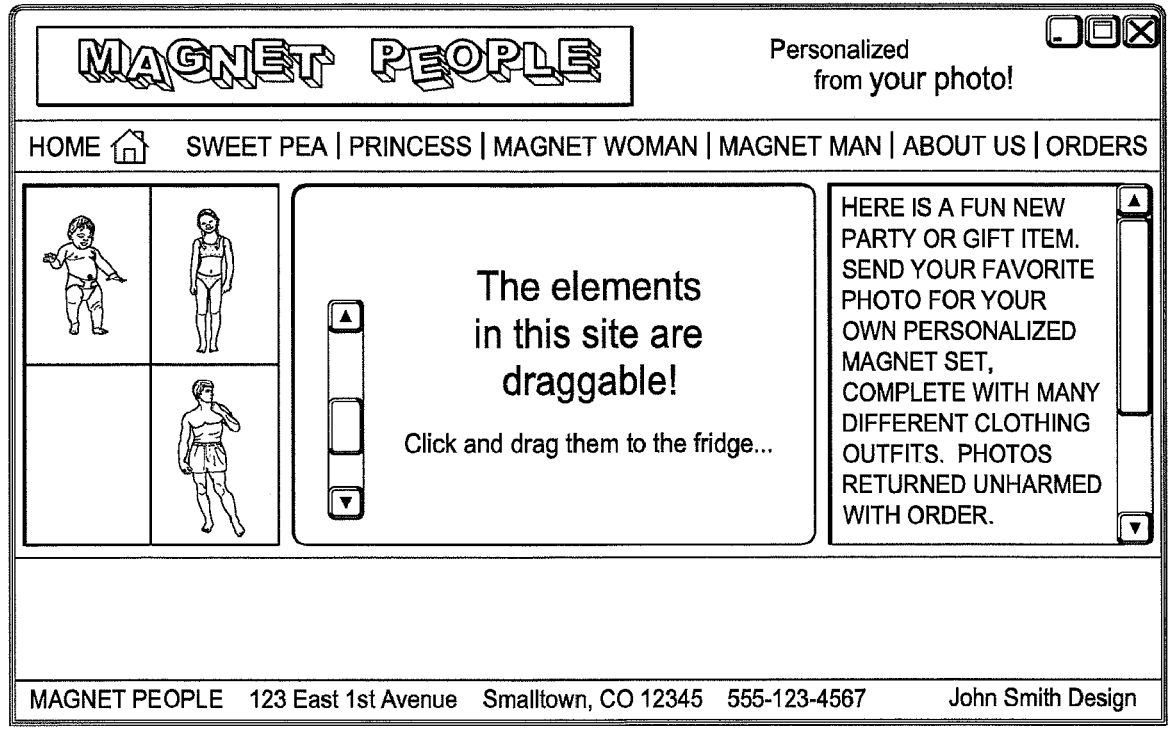
Figure 8:
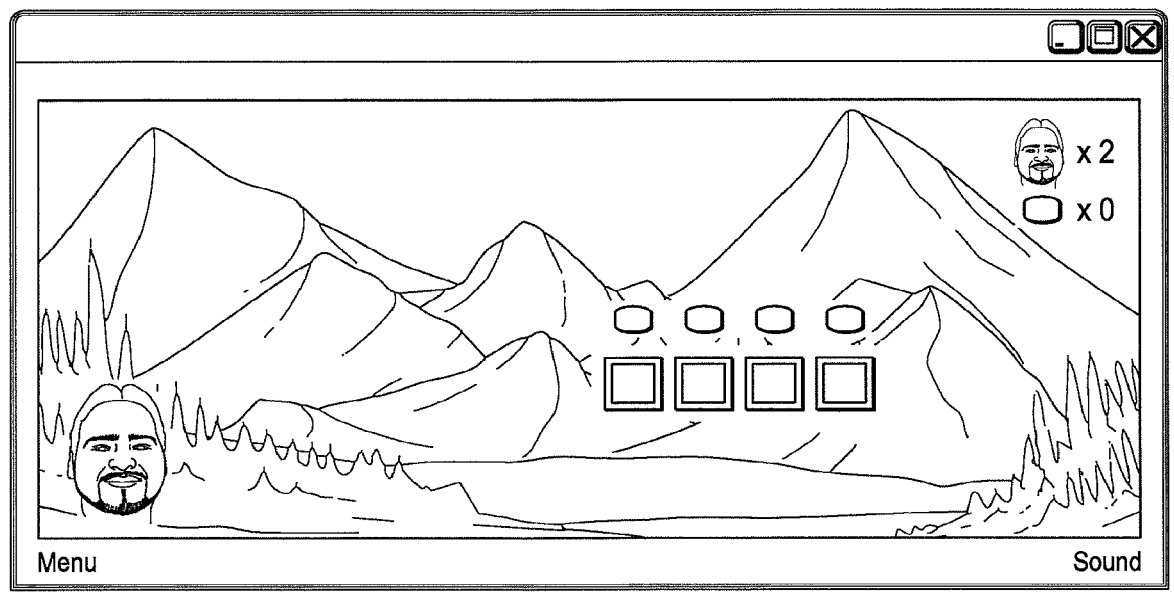
FIG. 8 is a screen shot from an exemplary souvenir video game with the user's face incorporated into the character that is played in the video game.
Figure 9:
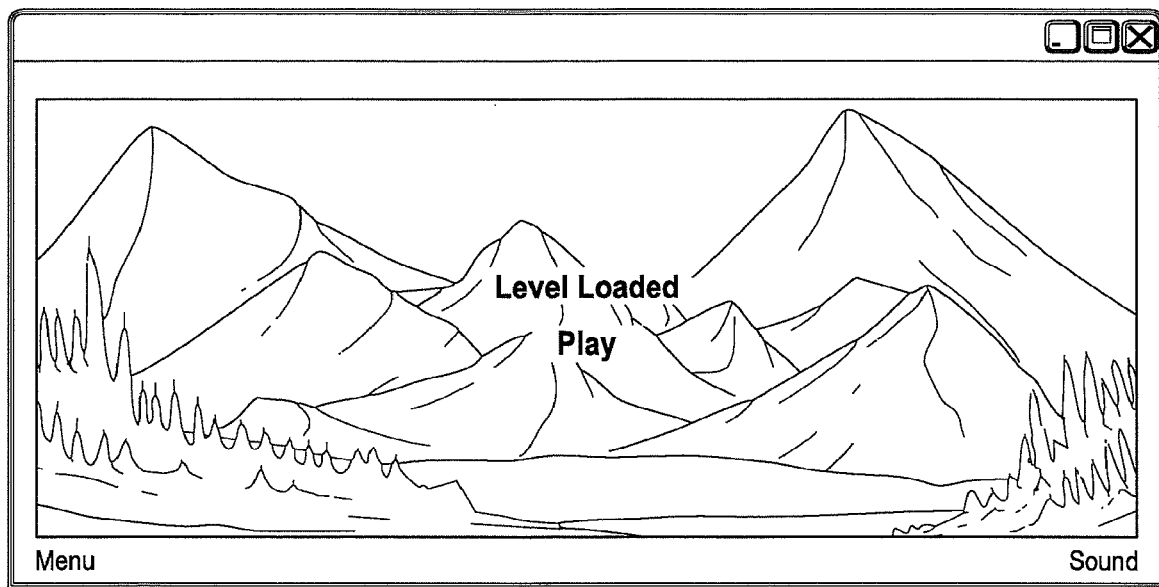
FIGS. 9 and 10 are screen shots from an exemplary souvenir video game.
Figure 10:
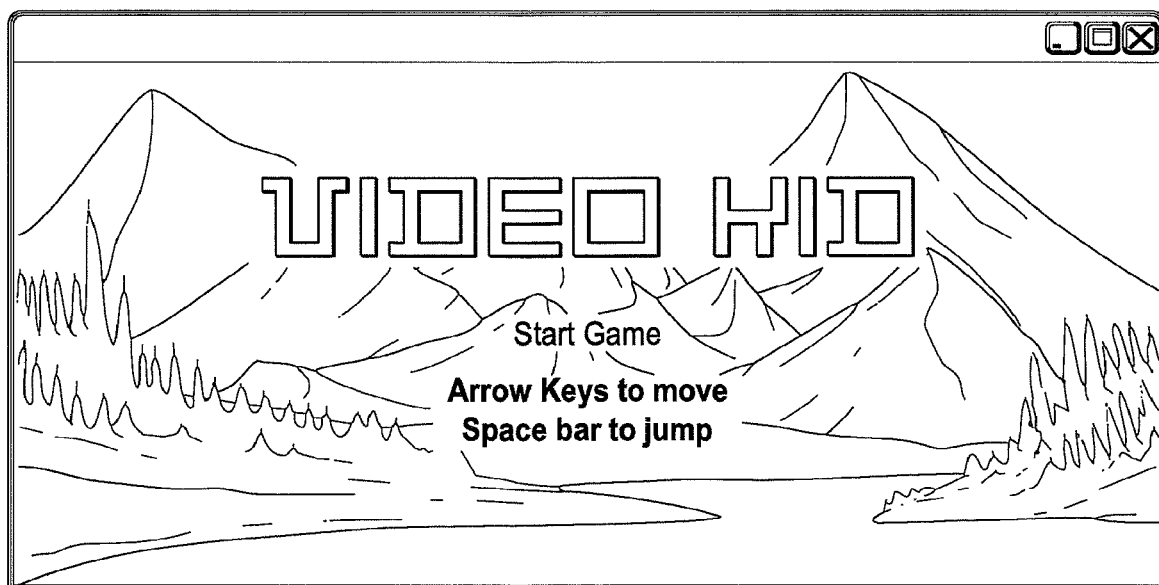
Figure 14:
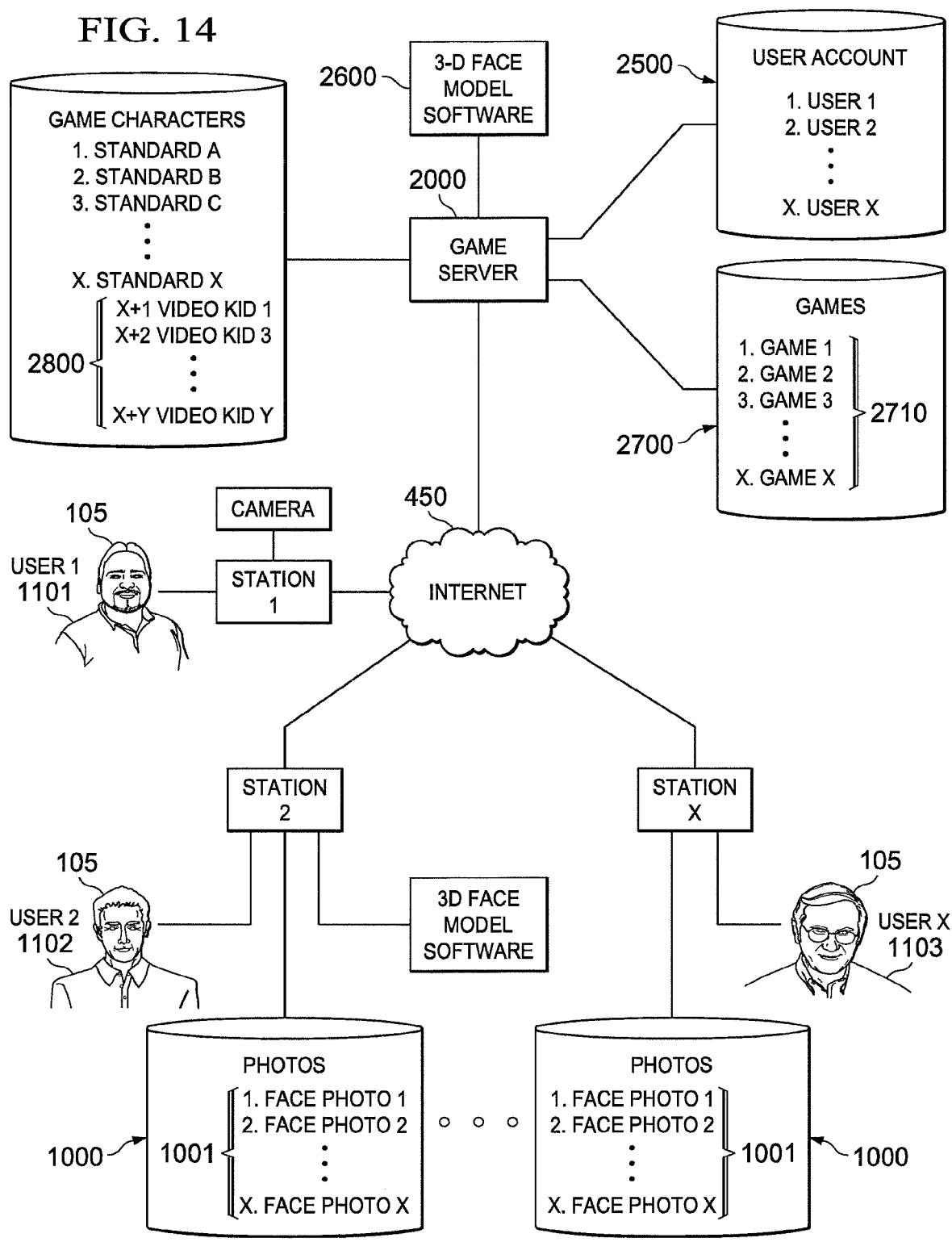
FIG. 14 is a system diagram for a multi-player online game system which morphs the face and other body characteristics of the characters for in one or more game incorporates.
Figure 15:
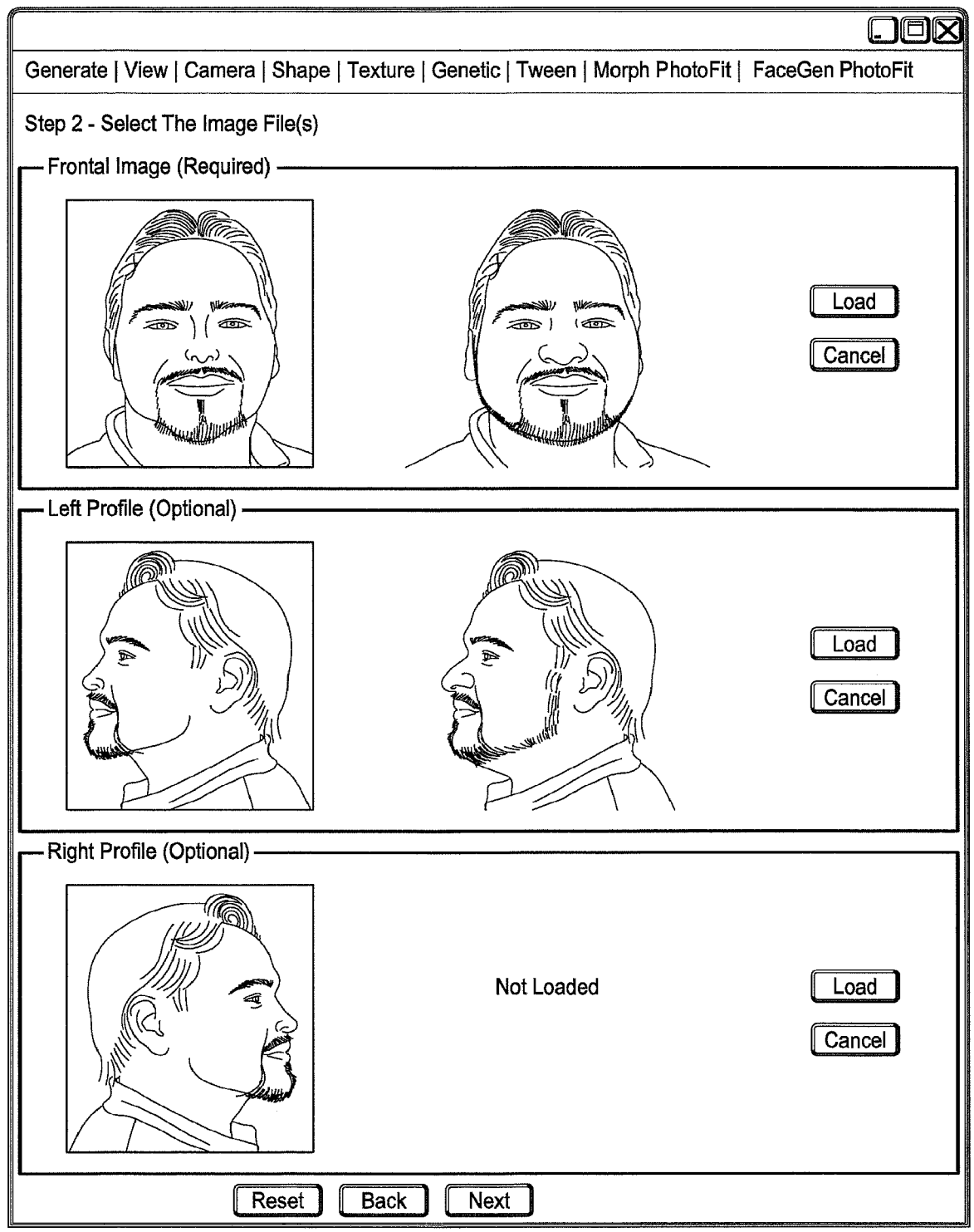
FIG. 15 is a screen shot from a 3D face image program.
Figure 16:
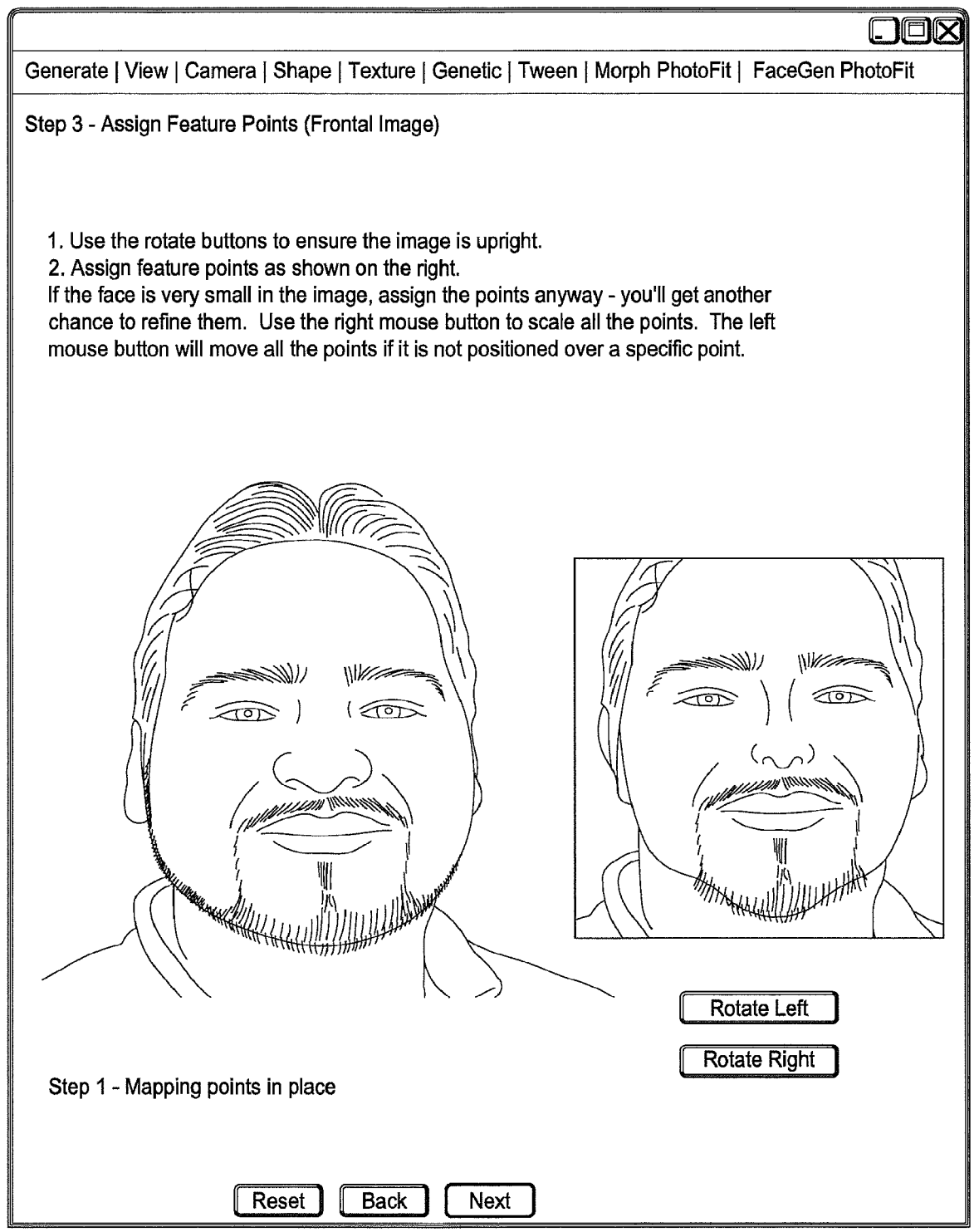
FIGS. 16 and 17 are screen shots from a 3D face image program for the frontal view.
Figure 17:
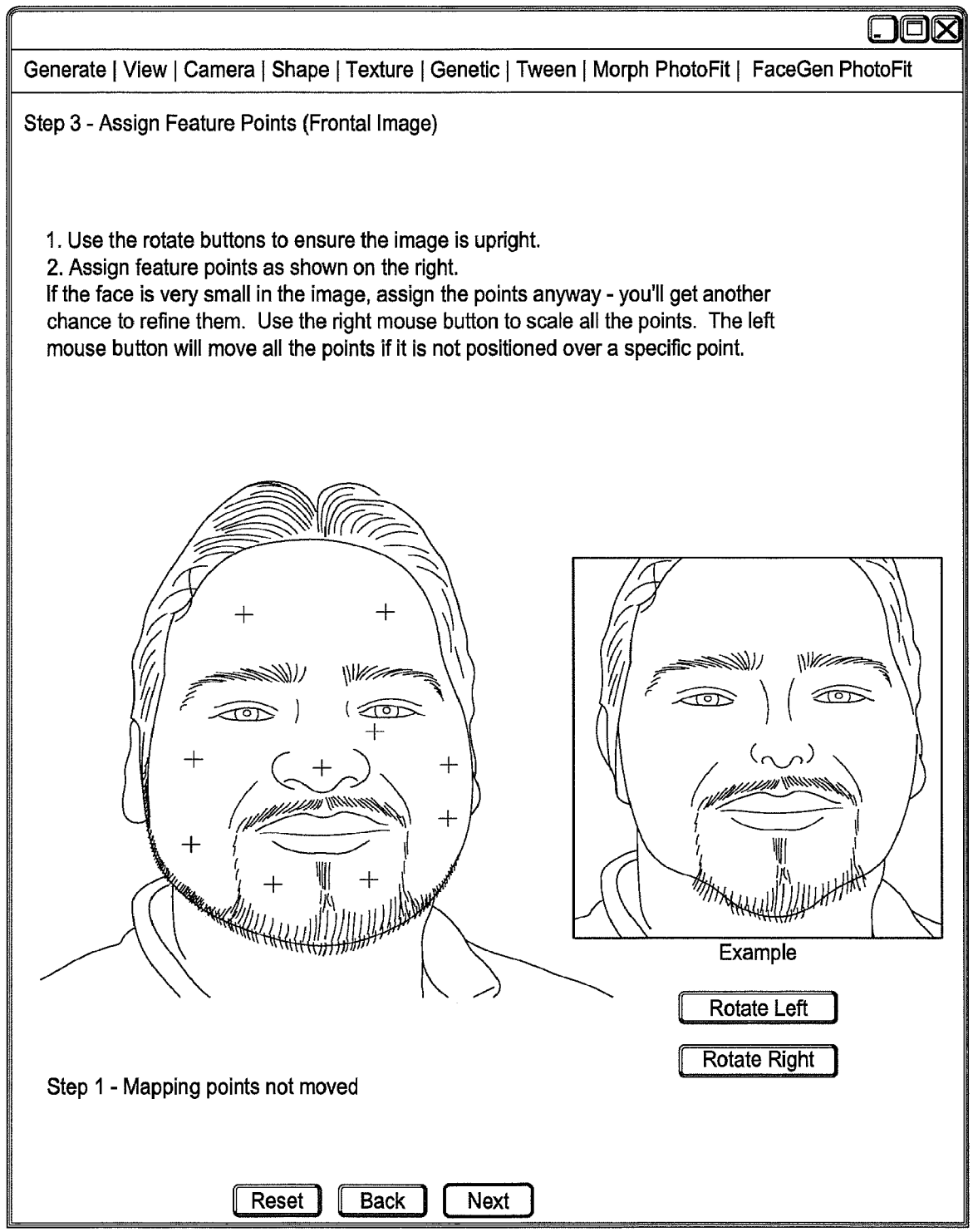
Figure 18:
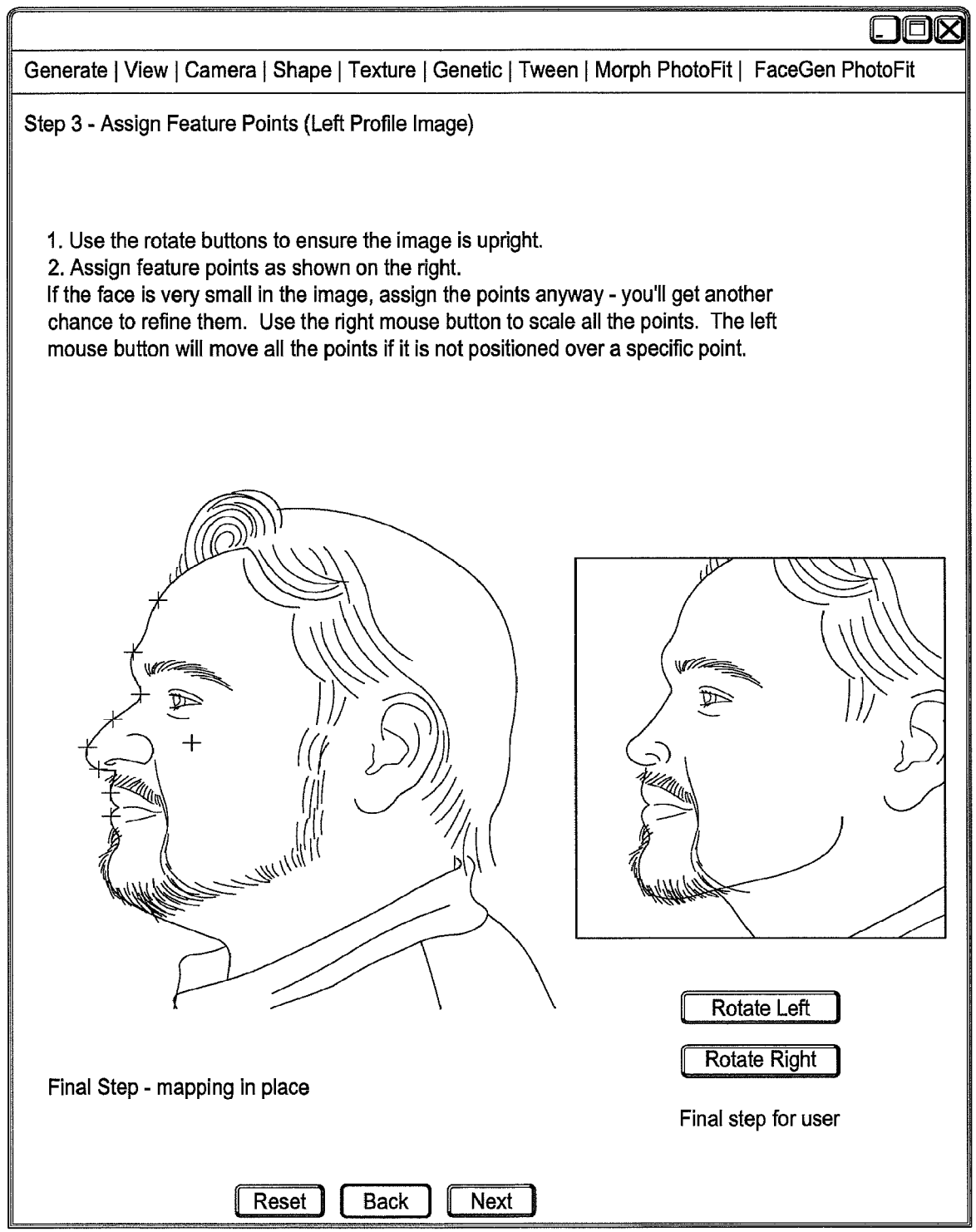
FIG. 18 is a screen shot from. a 3D face image program for a left profile image.

The helicopter will take off and you will see a series of shots 571, 573 taken from the perspective of the user 105 sitting inside the helicopter and the customer's image 520 will not be displayed during this time period and the film will discuss {narrate) what is taking place in the San Francisco image—what the observer s seeing, then the film may cut to a rickshaw with the user inside it in the Chinatown area of San Francisco, or inside a cable car window or on the BART [Bay Area Rapid Transit] transportation system 574 (FIG. 2, upper left quadrant—man in BART train), where the user's image is placed sitting down on the • train and the multiples layers of imaging allow the stored film clip of a thief to run past the user 105, steal a shopping bag placed on the ground in front of the user 105 and run out the other end of the car. As another example, if the user 105 chooses to be an astronaut, then the user's likeness is inserted into the proper location in the appropriate stored image 501, 502, 503, etc., and another diaphanous layer is placed on top of the user's image making it appear as though the user was wearing a spacesuit with glass on the user's face 575 (FIG. 2, upper right quadrant, man in spacesuit). Similarly, the user 105 may be placed in a small trailer of a current or classic movie, such as the "Wizard of Oz" 576 (FIG. 2, lower right quadrant man standing beside or interacting with Dorothy, the tin man, the Lion or the Scare Crow). In the case of video games (see the Computer Program Listing Appendix—video kid game), the user will have multiple images of themselves placed into existing or new video games where the size of the generic body will be selected for age and/or gender appropriateness. The user 105 will leave the booth 100 or the stand-in-front-of kiosk 100 with a customized video game where they, as the star, can run and jump and interact like other super stars in a video game, but this one is of the user 105. Personalized Enhanced Game Play. With reference to FIG. 14, Personalized Enhanced Game Play ("PEGP") can be used in either a home computer game or in a kiosk. PEGP can be used in either an existing game replacing the main character or other characters 6r in a game designed specifically for a custom video Kid" player. The user 105 {whether an "X-Box user or other video game user) has access to the internet 450 (either through the user's computer or, if at a kiosk 100, the kiosk 100 has such access 450). The user takes his/her own picture or uses a stored image 1001 from a store of images 1000. The user 105 uses his own computer or stands in a kiosk 100. The image is stored on a server 2000 where it uploads photos though website. There is account information 2500—log in information where it is stored. The video game (which may be selected from a library of video games 2700 (whether "X-Box" or other) has a feature that accepts "Video Kid" features. The game server 2000 uploads photos {in a most preferred embodiment, three photos from various orientations) on to the live game server 2000. The game server 2000 creates a 3D image map in their system using 3D face model software 2600 ("Face-Gen" or other similar software) and the video game 2710 allows integration of the user's 3D image into the game. The final product 2800 is stored on the game server 2000. After faces have been uploaded to a customized version of the video game (whether "X-Box" or other) that is capable of "Video-Kid" interactivity, the user will have availability (for example, a box in place on the user interface to "check here" if "Video Kid" player). They may be required to pay extra points (for example, extra "Microsoft points"} to use "Video Kid" features, or pays extra for the ability to use "Video Kid" features. Through the Kiosk 100 the user can pay to use "Video Kid" on own game cartridges. It is envisioned that "Video Kid" games for young people will have wholesome but interesting, non-violent games that parents will approve of for their children to play. There can be multiple players, user 1 1101, user 2 1102 etc. to user X 1103 on the same game—such as during set up choose Player "A" or Player "B". Through the processing software the user will interact with the software by using a "Face-Gen" type software with 3-D map geometry. After the 3-D image of the user is generated it is saved 2800 and becomes a part of the game. An existing game like "X-Box" can save the preferences to hard drive. "Video Kid" saves to removable media or under preferences on "X-Box" or other similar systems. The video game 2710 is built to accept 3-D. A simple version in 2-D can be used for hand held low resolution video games with still shots of user with fewer mapping points—such as location of chin and eyes only. It is important to use a camera with flash or appropriate lighting to avoid shadows on the face. When you use 3-D Geometry the texture is applied. Hairstyle choices are provided separately but may be part of initial software. Hairstyles may be user's or provided separately as generic choices. The 3-D game is image mapped. The game manufacturer loads the customized "Video Kid" image map 2800 and incorporates into their game 2710. In one embodiment the user can go to the game manufacturer's website—such as "X-box" and process the "Face-Gen" software 2600 there. The user 105 uploads his/her own face through the internet 450 by existing scanned or digital photo or live camera. This can take place in either a home environment or kiosk. The user would locate the points on the face mapping software to match the user. In the first step the whole map is initially moved to roughly correspond with the chin and nose and ears. The second step involves individual placement of each mapping point to exactly map the user's face for incorporation into the video game. After user completes the process the software is downloaded back to "X-Box" "preferences" where it completes the process of making a 3-D model and making it "Video-Kid" game ready to attach to a generic body. Different body types can be made-available such as but not limited to adult-large, adult-small frame, adult female or teenager male. The game manufacturer will have the software on their website to upload photos and perform "Face-Gen" type mapping to customize faces for incorporation into game (see FIGS. 15 through 18). As in FIG. 17, the eyes will be lined up and the generic face will be morphed to incorporate the user's face. A front image {FIGS. 16 and 17) is required with the side views optional. {See www.facegen.com). Cingular Versions Inc. Version 3.12-Use Software Developer kit through them for "Face-Gen" software. To use: Points align-click and drag points. Close up-Fine tune-Move individually-click on each point. The game can be X Box 360, Play Station 3 or other. For hand held devices this invention will use a memory card in the game (so the game must store personal information). Three phases for software building "Video Kid" builds and makes available a front end that passes to server. The software, if process is handled by location, needs to locate the customized images and load into the application with mapping points and send back to server. "Video Kid" writes and makes available software instruction to a backend and makes interface that manipulates photos. The software that is capable of uploading images and storing on server software will be written and available through "Video Kid". Then one needs to take and hook back into server with faces that are "Video Kid" ready and place into a "Video Kid" modified game. Complexions can be modified to make user older or younger or various complexion shades through "Face-Gen"—bodies will match complexion shades. There is a hair choice option-known choices, short, long, color straight, curly, wavy, bald. Eventually the user's hair may be a part of face mapping. Voices for game are male, female, child, etc.—when necessary. Male female are also possible choices. The games can be played over the Internet, on a cell phone or via satellite connectivity. Additional game features are: at game (whether "X-Box" or other) home page-enter through "Update" where one can add the "Video Kid" capability. "Demos" would demonstrate what will happen. "Trailers" would also demonstrate capability. "Enter Character Name" would save customization so that multiple players could use a single machine. "Video Kid" face saved to game under "Character Name" after first use. If multiple plays Player 1, Player 2, player preset saved. So, for example, the user can thus insert their own likeness into a game cartridge in the photo booth/kiosk 100 (as described herein or as equipped as described in U.S. Pat. No. 6,507, 361) and thus leave with a game cartridge to play in their game (whether X-Box, game boy, Play Station, etc. or equivalent). It can be 3-D or 2-D. The software dictates where the head is placed in each frame (See FIG. 12 as well as FIGS. 4, 5, 6 and B) and the pose such as full frontal, side, back, etc. The software can accommodate different body sizes and basic body type (e.g., whether chubby and 11-year-old male, thin a year-old male, petite 5-year-old female or tall and thin 40-year-old male), the head will be the appropriate size for the body. It should be noted that the system may use photos or images of one dimension to generate images of another dimension. For example, 2D photos can be used to generate a 3D image.

According to various embodiments, generation of the facial and/or head image corresponding to a body image can be accomplished in several alternate ways. For example, one embodiment involves two-dimensional facial or head generation. An image of a user's face is uploaded to a server or placed into a game assets library manually or automatically. The game loads a unique user image into empty file container. This container is attached to body container, which contains the body image. The facial (i.e., head) image is thus able to move with the body image.

According to a three-dimensional alternative, an image for a face (or head) is uploaded to a server or placed into a game assets library manually or automatically. The image is processed to create a flattened texture map that is wrapped onto a three-dimensional character's head or a wire mesh representation of the three-dimensional character's head. The image is in an image container containing the head with the head aligned to the template so that the total character can be coordinated for manipulation of movement and expression within the environment and the character can be stored within the stored background or within a game or can be stored separately for future play in another game or environment. Hair may be assigned separately from the user (e.g., by manual and/or preset choice, or by a default hair type). Optionally, hair may be included in the three-dimensional head creation process.

In another embodiment, motion scanning technology (e.g., Motion Scan technology by Depth Analysis) may be used to capture a user's head and facial expressions through the use of one or more cameras with Chroma Key functions. The images are processed in a computer using stereo vision techniques to produce a three-dimensional model of each frame. This can be accomplished in varying degrees of resolution for home computers or video kiosks (e.g., taking into account cost and memory considerations). The three-dimensional custom head and/or character can be saved and/or stored for future retrieval and play. The character can also be saved and/or stored within a video game. The head can be stored separately for attachment to various character bodies with appropriate comparable dimensions and/or other characteristics for a particular game or video clip (e.g., wearing an armored suit in a dragon video game or dressed as Dorothy in a Wizard of Oz film clip).

Preferably, regardless of the multi-dimensional techniques used, the character (and face/head) are viewable from multiple angles during play.

Using "open world" or "sandbox" technology personalized characters freely roam the open world in non-linear game play or travel on scripted paths in traditional game play giving the player (user) a desired level of control.

In at least some embodiments, the attachment of the head to the body and sizing of the head are critical issues. In at least some embodiments, the sizing, proportion and gender of the body are critical issues.

In at least some embodiments, the video game has the ability to record the player's own voice to be included for chosen moments and/or to accompany particular facial expressions. For example, a Karate-type yell recorded from the user may be incorporated to accompany a kick. As another example, the user's laugh or greeting to fellow players or characters within the game environment may be incorporated to accompany the user's facial expressions as represented on the multi-dimensional character face.

In another example embodiment, the three-dimensional video game incorporates autostereoscopic, three-dimensional hydrographic technology (no glasses or goggles required). For example, using software by Zebra or similar software, the game and personalized character can be played or viewed as in a personalized movie clip with the character acting in an interactive mode by full-parallax (viewing of the image from multiple angles such as from above, or below, or side-to-side in real time). The imagery in the video game can show motion capable animation or still shots (digital holography) or short clips that can be emailed to a recipient.

According to certain features, a customized multi-dimensional face or head may be sized (in multiple dimensions) to correspond to a multi-dimensional character body to which the head (or an image container containing the head) may be connected. The face, head, body and/or completed multi-dimensional character may be stored together or separately. Stored components may be stored within a video game or separately for incorporation into one or more games. In other words a game or video clip may be stored and may be capable of receiving customized, multi-dimensional character components. Alternatively, a game or video clip may have the customized, multi-dimensional character components incorporated therein and then stored.

The technology described herein may be used in, or adapted to, any suitable technology, such as games, movies, videos, advertisement, televisions, streaming videos, and the like.

The various embodiments allow for movement and actions of the personalized character within the personalized game to be controllable by the user. The personalized character is viewable in the personalized game from multiple perspectives. The personalized character is viewable in the personalized game in at least three dimensions. The personalized character is controllable in at least three dimensions. The personalized character may be viewed in the personalized game from multiple perspectives, and features of the personalized character are viewable from all of the multiple perspectives.

The various embodiments also provide for a game system that has a computer system comprising a game server operable to execute an electronic game, and an imaging system in electronic communication with the game server. The imaging system can generate a user image of at least one user. The game server can provide a three-dimensional image map comprising a plurality of mapping points, and enable the at least one user to electronically place each of the plurality of mapping points on one of a plurality of positions of the at least one user image. The game server can use the plurality of mapping points to transform the at least one user image into a three-dimensional user image. The game server can incorporate the three-dimensional user image into the electronic game. The three-dimensional user image has a three-dimensional image of the at least one user's head, and the game server can attach the three-dimensional user image to a user-selected character body having user-selected size, age and gender features. The three-dimensional user image can be incorporated into the electronic game by integrating the three-dimensional user image with a generic character image in the electronic game. The game server can use the plurality of mapping points to position the three-dimensional user image in a target position within the electronic game. The game server can replace at least a portion of an existing character image with at least a portion of the three-dimensional user image.

The invention also involves other additional aspects. For example, the dimensions and features of the personalized character may be rendered in multiple layers. The multiple layers may be provided automatically, manually, or by other processes. For example, the layers may be provided by click-and-drag functionality for multiple layering and image manipulation in changes of clothing and other aspects such as banners and any graphic or textual overlays.

The system may be configured to provide and store any media for any media application. Although various embodiments are described herein in connection with video games, for example, those embodiments are not so limited and those embodiments may incorporate any type of media content for any type of media application. For example, the system may generate and store video clips, videos, movies, stills, images, video games, multi-media messaging, social media, virtual reality, 3D rendering, and other electronic media. The applications can include any type of system, software, hardware, device, or network for transmitting, replaying, displaying, rendering, or otherwise providing media including game consoles, cameras, smart devices, computers, laptops, pads, etc. The media format may be multi-dimensional including 2D, 3D, or other multi-dimensional formats. The system may generate or store media and/or transmit media in connection with Email or other messaging environments and/or in connection with posting to multimedia sites.

In one specific example, external electronic media (e.g., a video clip) may be uploaded and saved to the database for incorporation with the user image, game or other media produced by the system. In one example, a user image produced by the system may be inserted into an uploaded video clip. Points may be assigned to the various frames of the video clip and the user image may be mapped to those points such that the user image appears to interact with objects in the video clip. In another example, an external video game may be uploaded and integrated with a user image, such that the user image appears to interact with people and objects in the video game. External images may be uploaded to be integrated with user images and other media produced by the system and/or with external electronic media that is uploaded to the system.

The system may produce media (e.g., customized videos, games, user images and the like) in both Chroma key and non-Chroma key versions. For instance, Chroma key renderings allow layering multiple images or video streams together based on color hues (chroma range). This is useful in integrating user images and other media produced by the system with each other and with external media that is uploaded for integration.

In another example additional feature, outfits and other accessories (or images thereof) may be selected for incorporation with user images and/or other people and objects within the system-produced media and/or uploaded media. In one configuration, a user may select outfits by clicking and dragging selection from a page or menu. In another example configuration, the outfits and other accessories may be automatically assembled for print, e-mail, game play or other entertainment purposes. This can involve any type of user interaction or production of media such as videos, games, greeting cards, virtual reality experiences or other entertainment.

The system itself may be incorporated into a kiosk, computer, electronic device, smart phone, or other device within the context of an artificial or actual environment.

The invention also includes an app for enabling a variety of functionality provided by the invention as already described herein. This can include such things as incorporating custom characters, user images, and other media into multiple types of outputs (e.g., games, cards, movies, social media, etc.). Both still-image and video capability may be supported by the app. The app may also enable incorporation of personalized character with 2D, 3D, or other multi-dimensional environments.

The system may also be configured to allow customized characters to move freely through environment viewable from multiple perspectives. The characters may be controllable or automatically set, depending on user preferences and other applicable circumstances.

Multi-dimensional (e.g., 2D or 3D) custom characters may be saved and stored as characters with capability of use in any output (e.g., games, videos, movies, film clips, card, magnet substrates, etc.).

Still other features may be incorporated into the various teachings and embodiments of the invention. For example, in certain embodiments, the invention may be used to create products including souvenir videos and/or video greeting cards in which the user is viewable as a character within the video and in which one or more video scenarios may be selectable by the user.

In another embodiment, the user may incorporate a character (e.g., a character based on the user and created according to one or more of the embodiments already described) into one or more film clips (e.g., movies) replacing an existing character (e.g., a default character) and/or a space set aside and available for receiving a user-generated character. This allows the user to generate a new, selectable video clip.

According to another embodiment, once a video (or other media product) is generated, the user may Email that media product to another. Of course the media product may be sent by way of any other suitable transmission method such as text or social media, for example.

According to another embodiment, the booth, kiosk, or other computer device used to generate a media product can be configured to provide a hard copy, email, text, social media or storage method for a customer to store the product, send the product to another user or device, or take the product with them to keep or use later, for example, as a souvenir.

According to another embodiment, outfits and/or other objects associated with a character are draggable (e.g., changeable) within the media product, film clip, film, greeting card or still image such as exhibited in the MagnetPeople figure described herein. This may be accomplished in multiple dimensions, such as two- or three-dimensional inclusion. The user can select and relocate objects or alter scenes within image scenarios of multiple dimensions (e.g., two or three dimensions).

Various embodiments may incorporate "face swapping" technology and/or "deepfake" technology. Various features and aspects of the embodiments of the invention may be presented to users as one or more "Apps." The various embodiments may incorporate any suitable image manipulation technology and multiple layering technology.

According to another embodiment, when a user's image or any other foreground or background layer or image is merged into an existing or new foreground or background layer or image, video game, App or any other combined image, the background pixels may be blended into the foreground or background images to provide a seamless appearance such as to appear original and/or realistic.

Various embodiments may incorporate appropriate shadows or shadowing to be provided when any foreground or background image is merged into another foreground or background image, if desired, to provide a seamless appearance and so as to appear original or realistic.

According to another embodiment, a user may add layers on or behind existing layers to alter an image to show additional features including, but not limited to, clothing or additional images of multiple people as characters in the movie, film clip, greeting card, text, email, social media, television, electronic billboard display, or other media product.

A further understanding of the nature and advantages of the invention herein may be realized by reference to the other materials described herein, attached hereto or incorporated by reference.

What is claimed is:

1. A media system, for displaying at least one user image over a network, comprising:
   a computer system comprising a media server operable to execute a media application, and an imaging system in electronic communication with the media server;
   the imaging system generating at least one user image of the at least one user;
   the media server operable to provide a multi-dimensional image map comprising a plurality of mapping points for placement on the at least one user image;
   the media server operable to use the plurality of mapping points to transform the at least one user image into a multi-dimensional user image;
   the media server operable to present the at least one user with an image of the at least one user, to provide a first indicator on the image to which the at least one user may align a feature of the at least one user on the image, and to provide a movable indicator on the image, the movable indicator adjustable to align with a second feature of the at least one user on the image while the at least one user holds alignment of the first feature to the first indicator;
   the media server operable to size the multi-dimensional user image by determining a distance between two positions on the multi-dimensional user image, the determined distance being proportional to a distance between the first and second feature of the at least one user, the first and second features corresponding to the two positions on the multi-dimensional image; and
   the media server operable to incorporate the multi-dimensional user image into the media application.

2. The media system of claim 1, wherein the multi-dimensional user image depicts a plurality of features, and wherein the media server is operable to perform deepfake substitution of a second image for a first image in the media application, the substitution comprising swapping one feature for another in the multi-dimensional user image.

3. The media system of claim 1, wherein the multi-dimensional user image comprises a plurality of components, and wherein the media server is operable to blend two or more of the plurality of components of the multi-dimensional user image.

4. The media system of claim 1, the media server configured to enable a user to drag objects associated with a character into the media application and associate the objects with the multi-dimensional user image.

5. The media system of claim 1, configured to operate in conjunction with a software app.

6. The media system of claim 1, wherein movement of the multi-dimensional user image within the media application is non-scripted.

* * * * *